United States Patent
Bifulco et al.

(10) Patent No.: US 10,880,413 B2
(45) Date of Patent: Dec. 29, 2020

(54) METHOD AND SERVER FOR ESTABLISHING A TCP CONNECTION

(71) Applicant: NEC Laboratories Europe GmbH, Heidelberg (DE)

(72) Inventors: Roberto Bifulco, Heidelberg (DE); Simon Kuenzer, Waghaeusel (DE)

(73) Assignee: NEC CORPORATION, Tokyo (JP)

( * ) Notice: Subject to any disclaimer, the term of this patent is extended or adjusted under 35 U.S.C. 154(b) by 168 days.

(21) Appl. No.: 16/072,196

(22) PCT Filed: Jan. 26, 2016

(86) PCT No.: PCT/EP2016/051561
§ 371 (c)(1),
(2) Date: Jul. 24, 2018

(87) PCT Pub. No.: WO2017/129229
PCT Pub. Date: Aug. 3, 2017

(65) Prior Publication Data
US 2019/0037054 A1    Jan. 31, 2019

(51) Int. Cl.
| | | |
|---|---|---|
| *H01L 29/06* | (2006.01) | |
| *H04L 29/06* | (2006.01) | |
| *H04L 12/801* | (2013.01) | |
| *H04L 12/841* | (2013.01) | |
| *H04L 12/707* | (2013.01) | |
| *H04L 29/08* | (2006.01) | |

(52) U.S. Cl.
CPC ............ *H04L 69/163* (2013.01); *H04L 45/22* (2013.01); *H04L 47/193* (2013.01); *H04L 47/283* (2013.01); *H04L 67/2814* (2013.01)

(58) Field of Classification Search
CPC ... H04L 69/163; H04L 47/193; H04L 47/283; H04L 45/22; H04L 67/2814
See application file for complete search history.

(56) References Cited

U.S. PATENT DOCUMENTS

| | | | |
|---|---|---|---|
| 2005/0188101 A1* | 8/2005 | Ludwig | H04L 47/10 709/238 |
| 2008/0235382 A1* | 9/2008 | Marwah | H04L 69/16 709/228 |
| 2009/0141707 A1* | 6/2009 | Kavanaugh | H04W 76/50 370/352 |

(Continued)

*Primary Examiner* — Moustafa M Meky
*Assistant Examiner* — Kidest Mendaye
(74) *Attorney, Agent, or Firm* — Leydig, Voit & Mayer, Ltd.

(57) ABSTRACT

A method for establishing a TCP connection between a first end-point and a second end-point includes: establishing a first TCP connection between the first end-point and the second end-point; the second end-point dynamically deciding on redirecting the first TCP connection via a chain of proxies that interconnects the first end-point and the second end-point; based upon a case of a redirection decision by the second end-point occurring, the first end-point establishing a new TCP connection with the first proxy of the chain of proxies; and establishing a segmented TCP connection between the first end-point and the second end-point via the chain of proxies and transferring data between the first end-point and the second end-point through the chain of proxies.

18 Claims, 2 Drawing Sheets

(56) References Cited

U.S. PATENT DOCUMENTS

| | | | |
|---|---|---|---|
| 2013/0091273 A1* | 4/2013 | Ly | H04L 67/2804 709/224 |
| 2013/0111038 A1* | 5/2013 | Girard | H04L 47/803 709/226 |
| 2014/0036674 A1* | 2/2014 | Agrawal | H04L 69/163 370/235 |
| 2015/0188949 A1* | 7/2015 | Mahaffey | H04W 12/0027 726/1 |
| 2015/0312383 A1* | 10/2015 | Roeland | H04L 69/18 370/331 |
| 2016/0359681 A1* | 12/2016 | McGleenon | H04L 69/326 |

* cited by examiner ial Application was published in English on Aug. 3, 2017
METHOD AND SERVER FOR ESTABLISHING A TCP CONNECTION

CROSS-REFERENCE TO PRIOR APPLICATIONS

This application is a U.S. National Stage Application under 35 U.S.C. § 371 of International Application No. PCT/EP2016/051561 filed on Jan. 26, 2016. The International Application was published in English on Aug. 3, 2017 as WO 2017/129229 A1 under PCT Article 21(2).

FIELD

The present invention relates to a method for establishing a TCP connection between a first end-point and a second end-point. Furthermore, the present invention relates to a server being configured to establish a TCP connection with a client.

BACKGROUND

TCP (Transmission Control Protocol) is a widely used communication service that operates on top of the network layer of the Internet model and provides host-to-host connectivity at the transport layer. TCP, which is a rate-adaptive protocol, implements several control mechanisms for packet deliveries between hosts in a communications network, among them are flow control and congestion control mechanisms.

The TCP flow and congestion control algorithm is dependent on the round trip time (RTT) between the two parties involved in the communication (typically a client and a server). When the RTT is large, the time it takes for TCP flow control to converge to the actual available bandwidth grows. Currently, there are a few solutions to address the issue.

For instance, a possibility is to fine-tune the TCP flow control algorithm for the greater RTT. However, this requires manual configurations, and a careful selection of the parameters, while managing those parameters on a per-connection basis. Alternatively, Wide-Area-Network (WAN) optimizer can be deployed at the two ends of the communication. The optimizers use normal TCP with the client and the server, while using custom, WAN-optimized protocol configurations between them. However, the inventors have recognized that this solution has the disadvantage of deploying specialized devices at both ends of the communication, requiring ad-hoc developed protocols between them.

SUMMARY

In an embodiment, the present invention provides a method for establishing a TCP connection between a first end-point and a second end-point, the method including: establishing a first TCP connection between the first end-point and the second end-point; the second end-point dynamically deciding on redirecting the first TCP connection via a chain of proxies that interconnects the first end-point and the second end-point; based upon a case of a redirection decision by the second end-point occurring, the first end-point establishing a new TCP connection with the first proxy of the chain of proxies; and establishing a segmented TCP connection between the first end-point and the second end-point via the chain of proxies and transferring data between the first end-point and the second end-point through the chain of proxies.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
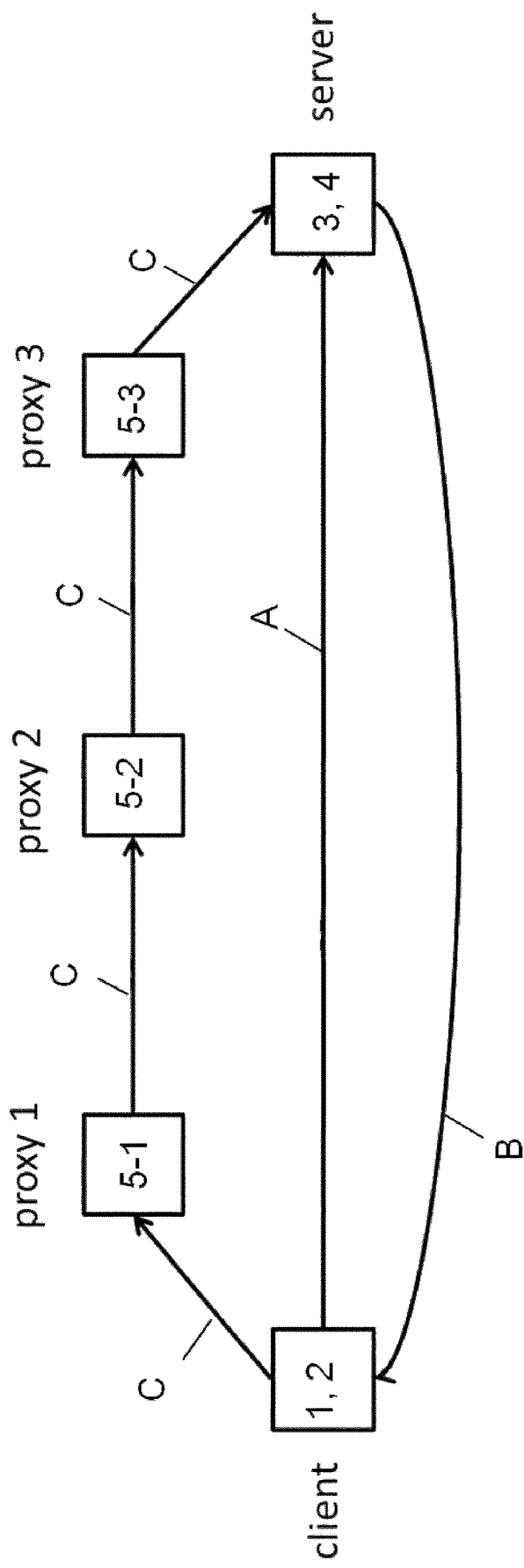
FIG. 1 is a schematic view illustrating the general concept of TCP flow establishment in accordance with an embodiment of the present invention.

Embodiments of the present invention improve and further develop methods for establishing a TCP connection and a server of the initially specified types in such a way that a TCP acceleration with reduced end-to-end transfer times is achieved, while at the same time the problems of conventional solutions mentioned above are being avoided.

In accordance with the invention, the aforementioned improvement is accomplished by a method for establishing a TCP connection between a first end-point and a second end-point, the method including: establishing a first TCP connection between the first end-point and the second end-point, the second end-point dynamically deciding on redirecting the first TCP connection via a chain of proxies that interconnects the first and the second end-points; in case of a redirection decision by the second end-point, the first end-point establishing a new TCP connection with the first proxy of the chain of proxies; and establishing a segmented TCP connection between the first end-point and the second end-point via the chain of proxies and transferring data between the first end-point and the second end-point through the chain of proxies.

Furthermore, the improvements are accomplished by a server, being configured to establish a TCP connection with a client, the server including: a receiving component being configured to receive a request for TCP connection establishment from a client, an analyzing component being configured to determine and/or evaluate, based on the request for TCP connection establishment from the client (2), one or more variables—end-to-end performance variables—that may affect the end-to-end flow performance towards the client, and decision means for dynamically deciding on redirecting a first TCP connection via a chain of proxies that interconnects the server with the client.

According to embodiments of the invention, it has first been recognized that TCP acceleration with reduced end-to-end transfer times can be achieved by deploying one or more TCP proxies in the network and adopting a number of these TCP proxies on the end-to-end path of the connection to form a chain of TCP proxies. In this way, a segmented TCP connection between the first end-point and the second end-point is established via the chain of proxies, and data between the first end-point and the second end-point can be transferred through this chain of proxies. According to embodiments of the invention, the redirection of the first TCP connection to the chain of proxies is not applied mandatorily or consistently, but the second end-point dynamically decides on such redirection, for instance on a case-by-case (e.g. flow-by-flow) basis. Consequently, the present invention enables a dynamic acceleration of TCP flows without requiring any change to the end-hosts TCP network stack.

Embodiments of the invention require the availability of TCP proxies deployed in the middle of the path between the communication's end-points. The more (performance enhancing) TCP proxies are/can be deployed, the more effective the embodiment is. In case of MPTCP, the TCP proxies of embodiments are able to proxy an MPTCP subflow.

Embodiments according to the present invention do not require any changes to the TCP configuration and do not introduce typical disadvantages of TCP tuning (e.g., buffer bloat, increased recovery cost in case of losses, etc.). Embodiments optimize TCP of unmodified end-hosts, using explicit redirection of TCP flows through a chain of TCP proxies. Since the present invention does not require any modifications, neither of the TCP configuration nor of the end-hosts (in particular, no special purpose network stacks are required at the end-hosts), the solution works also with L4+ encryption. Consequently, it can be suitably applied for improving (i.e. accelerating) TLS (Transport Layer Security) performance.

According to a preferred embodiment, the first end-point may be a client and the second end-point may be a server, wherein the client contacts the server by sending a request to download a given resource, e.g. a particular data file, from the server, in accordance with a typical practical use case. For instance, the client may be a Web browser implemented on a desktop computer or on a tablet, and the server may be a Web server. However, as will be easily appreciated by those skilled in the art, different client/server architectures may be used likewise.

Each proxy of the chain of proxies between the first end-point and the second end-point of the segmented TCP connection as well as the second end-point itself function as end-points of the respective segment of the segmented TCP connection. According to a preferred embodiment, it may be provided that each segment end-point of the segmented TCP connection, i.e. each proxy of the chain of proxies as well as the second connection end-point (e.g. server), runs a TCP flow control algorithm independently from the other segment end-points of the segmented TCP connection. Advantageously, since in this case the RTT between the segment end-points is smaller than the RTT between the connection end-points, the convergence time of the individual TCP flow control algorithms of the segments is lower than the convergence time of a single (i.e. 'global') TCP flow control algorithm applied on the end-to-end path.

According to a preferred embodiment, the second end-point, upon being contacted by the first end-point, may determine and/or evaluate one or more variables —end-to-end performance variables— that may affect the end-to-end flow performance between the first and the second end-points. In this regard it should be noted that an improvement on the flow transfer time may depend on a number of variables, which include the end-to-end round trip time (RTT) of the path between the first (e.g. client) and the second (e.g. server) end-point (RTT-CS), the bandwidth of the path between the end-points (BW-CS), the size (usually expressed in bytes) of the data transferred by a flow (SIZE). As will be easily appreciated by those skilled in the art, there may be many additional variables (e.g. delay or the like) that may influence the flow transfer performance. However, for the sake of explanation clarity, the description hereinafter will generally focus on the mentioned three variables (RTT-CS, BW-CS, SIZE), and will use the general term 'end-to-end performance variables' to refer to all the variables that may affect the end-to-end flow performance.

According to a preferred embodiment, it may be provided that the first TCP connection between the first end-point and the second end-point is established by the first end-point performing a three-way TCP or MPTCP (Multipath TCP) handshake with the second end-point. From this handshake the second end-point may already extract one or more of the end-to-end performance variables, for instance an estimation of the RTT-CS.

According to a preferred embodiment, the above specified determination and/or evaluation of one or more of the end-to-end performance variables may form the basis for the second end-point to decide on whether to redirect or not an incoming network flow from the first end-point through the chain of proxies. Similarly, according to embodiments explicit redirection of network flows through a chain of proxies may be performed based on the analysis of end-to-end network path's and data transfer's performance metrics.

According to a preferred embodiment, the second end-point, after deciding to perform a connection redirection, may send a redirection command to the first end-point, wherein the redirection command contains an indication of the first proxy of the chain of proxies, for instance by including the IP address and/or port number of the first proxy of the chain into the redirection command message.

According to a preferred embodiment, the redirection command may contain an instruction for the first end-point to download a requested resource from the first proxy of the chain of proxies. Alternatively, in case of both parties supporting and applying MPTCP, it may be provided that the redirection command contains an instruction for the first end-point to add an MPTCP subflow through the chain of proxies. In any case, it may be provided that the first end-point is configured to establish a new TCP connection with the first proxy in the chain of proxies upon reception of a redirection command from the second end-point.

In particular in case of applying MPTCP, according to a preferred embodiment it may be provided that, while the additional MPTCP subflow (i.e. the segmented TCP connection) is being established via the chain of proxies, the second end-point of the connection (i.e. typically the server) starts already to transmit data through the original subflow (i.e. the first TCP connection). Once the new subflow is connected to the chain of proxies, the server may close the original subflow.

According to an embodiment the chain of proxies may be pre-established which means, for instance, that the server (or the server's administrator) triggers the deployment of a number of proxies proactively, and it configures each proxy to retrieve a given resource from the next proxy in the chain, with the last one configured to retrieve the resource from the server (i.e. the second endpoint of the first TCP connection). Alternatively, it may be provided that the chain of proxies is established dynamically, with each proxy autonomously deciding on the next hop of the chain for retrieving a given resource. Likewise, the chain's proxies may be created proactively or dynamically, e.g. by booting virtual machines on the fly when the server receives a TCP connection request.

Embodiments of the present invention as described hereinafter build on the observation that lowering the RTT between the end-points of a TCP connection makes the flow control algorithm's convergence time smaller.

For example, assuming a client downloads a 400 Kbit file from a server, over a 10 Mbit/s link, with 40 ms as round trip time. If the flow control algorithm would converge to the 10 Mbit/s bandwidth instantaneously, then the file would be downloaded in 40 ms (400 Kbit/10 Mbit). However, since TCP is a rate-adaptive protocol, the standard TCP's flow control algorithm slowly increases the connection speed depending on the received Acknowledgement (ACK) during the connection. Assuming that the server starts sending the first 100 Kbit of a file and then doubles the amount of sent data after the reception of an ACK (e.g., as it happens during the TCP slow start phase) until convergence, i.e., the maximum bandwidth, is reached. That is, the sender will send 100 Kbit then wait for ACKs, then it will send 200 Kbit and again wait for the ACKs, then it will send 400 Kbit and so on.

Considering that each increment happens after an ACK is received, and that ACKs are sent only upon reception of data, then, the server performs an increment in the sending rate every 40 ms, i.e., every RTT. To send 400 Kbit under this assumption, the server would then take 3 RTT, sending the following amount of data at each transmission: 100 Kbit, 200 Kbit, 100 Kbit (It could send up to 400 Kbit but the file size is 400 Kbit in total and only 100 Kbit are left to send).

Thus, in the previous case it would take 3 RTT=40 ms×3=120 ms to transfer the 400 Kbit, which corresponds to an average transfer rate of 3.3 Mbit/s.

Considering now the case in which the transfer happens over a link with 20 ms as RTT, the server would still require 3 RTT to send the data, but, this time, it would take 3 RTT=20 ms×3=60 ms to transfer the 400 Kbit, which corresponds to an average transfer rate of 6.6 Mbit/s.

In most of the cases, the RTT cannot be arbitrarily changed, in particular when it is mainly caused by the propagation delay (i.e., the time it takes for a signal to travel from a point to another point). However, dividing the end-to-end connection in a number of segments guarantees that each of the segments has a smaller RTT between the segments' endpoints than the RTT between the connection's end-points. Thus, if each segment end-point runs a TCP flow control algorithm independently from the other segments end-points, then, the convergence time for each segment is lower that the convergence time on the end-to-end path.

To achieve a segmented TCP connection and to thereby accelerate the transfer time of a TCP flow, it is assumed that a number of TCP proxies are deployed in the network, and embodiments of the invention adopt a variable number of these TCP proxies on the end-to-end path of the connection, as shown in FIG. 1.

According to the illustrated embodiment, the general procedure for achieving a reduced TCP end-to-end transfer time is as follows: a first end-point 1, which is a client 2, initiates a TCP connection —first TCP connection, denoted 'A' in FIG. 1—with a second end-point 3, which is a server 4. The server 4 dynamically takes the decision of redirecting the flow through a chain of TCP proxies 5 and communicates such decision to the client 2 (in FIG. 1, the respective message is denoted 'B'). The client 2 establishes a connection with the first proxy 5-1 in the chain, which in turn is connected to the second proxy 5-2, which in turn is connected to the third proxy 5-3. The last proxy 5-3 in the chain is connected to the server 4. Once the client 2 is connected to the proxy chain, the TCP flow data transfer can start via this segmented TCP connection (denoted 'C' in FIG. 1).

Since the end-to-end performance variables change for each flow, in the moment in which a flow is first established, the knowledge of such variables may be unknown to the flow initiator, i.e., to the client 2 (it should be recalled that a TCP connection is always initiated by the client). For example, the client 2 may ignore the RTT-CS since no packets have been exchanged with the server 4 yet. The server 4 may instead have more chances to value the performance variables, since it may be the destination of several other flows, thus, it may use previous knowledge to infer the end-to-end performance variables. Without loss of generality, it is assumed in the embodiments described hereinafter that the client 2 always starts a new TCP flow directly with the server 4. Likewise, it is assumed that the server 4 is the end-point 3 that always decides if the transfer of data for such TCP flow should happen using a chain of TCP proxies 5. However, as will be easily appreciated by those skilled in the art, solutions that are similar to the ones described herein may be applied to the case in which the client 2 is the one deciding to use a chain of TCP proxies 5 to perform the data transfer on the basis of an accelerated TCP flow.

In more detail, the operations according to the embodiment illustrated in FIG. 1 unfold as follows:

1) Connection Establishment:

In this phase the client 2 contacts the server 4, which learns the client-related information, such as some of the end-to-end performance variables. For instance the client 2 may perform the three-way TCP handshake, from which the server 4 extracts, e.g., an estimation of the RTT-CS. Then, the client 2 may send a HTTP REQUEST (denoted 'A') to the server 4 (where HTTP is used on top of TCP), from which the server 4 is able to infer the SIZE of the data transfer (e.g., the HTTP REQUEST's URL points to a specific server's 4 resource). Although not explicitly shown in FIG. 1, the server 4 may include a receiving component that is configured to receive the request for a TCP connection establishment (i.e. message 'A' in FIG. 1) from client 2. Furthermore, the server 4 may include an analyzing component that may be configured to determine and/or evaluate, based on the request for TCP connection establishment from client 2, one or more of the end-to-end performance variables (i.e. the parameters that may affect the end-to-end flow performance towards the client 2).

2) Connection Redirection:

The server 4, based on the end-to-end performance variables derived in the above step 1) and/or inferred from previous knowledge, takes a decision to redirect (or not) the incoming TCP flow from the client 2. To this end, the server 4 may include decision means that may be configured to receive evaluation results of the end-to-end performance variables from the server's 4 analyzing component and to dynamically decide on the redirection based thereupon. If a proxy chain should be used, the decision is communicated back to the client 2. For instance, in case of using HTTP, the server 4, based on the end-to-end performance variables, takes a decision to redirect the incoming HTTP request 'A' to a chain of TCP proxies 5. Thus, the server 4 sends to the client 2 a HTTP REDIRECT message (denoted 'B'), which informs the client 2 that the requested resource should be downloaded from a different server, which is the chain's first proxy 5-1.

3) Chain Establishment:

The client 2, upon reception of redirection command 'B', establishes a new connection 'C' with the proxy chain (i.e., with the first proxy 5-1 in the chain). Each proxy 5 of the chain connects to the next proxy in the chain, with the exception of the last chain's proxy 5-3, which connects to the server 4. Here, it should be noted that the number of three proxies to be part of the chain of proxies has been arbitrarily chosen and that this number may be higher or lower.

The establishment of the chain could happen in different ways: According to one embodiment the chain is pre-established which means, for instance, the server 4 (or the server's administrator) triggers the deployment of a number of proxies 5 proactively, and it configures each proxy 5 to retrieve a given resource from the next proxy 5 in the chain, with the last proxy 5-3 configured to retrieve the resource from the server 4. According to another embodiment the chain is dynamically-established which means, for instance, the server 4 (or the server's administrator) triggers the deployment of a number of proxies 5 proactively, but it does not configure the proxies 5 in advance. Each proxy 5 autonomously decides if the next hop for requesting a given resource should be another proxy 5 (and which one) or the server 4.

4) Data Transfer:

Once the connection 'C' through the chain of proxies 5 is established, data is transferred through the chain.

As will be easily appreciated by those skilled in the art each of the aforementioned phases can be performed in different implementations and adopting different techniques and/or technologies, without departing from the scope of the present invention.

Figure 2:
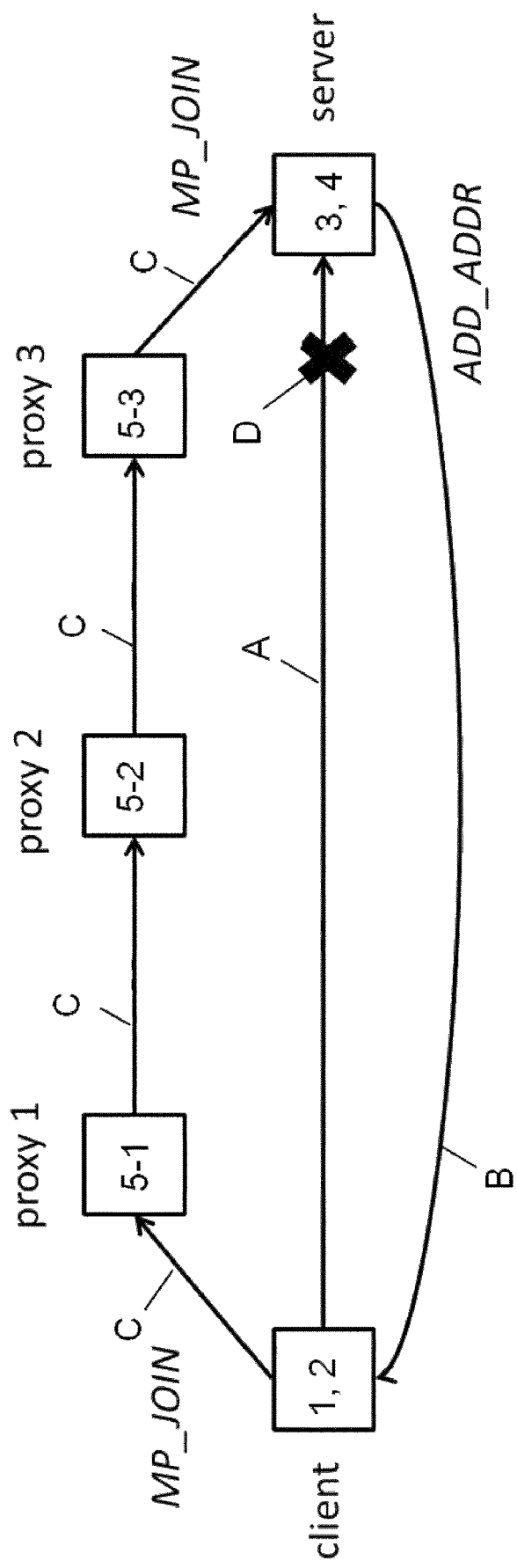
FIG. 2 is a schematic view illustrating the establishment of an MP-capable TCP flow in accordance with an embodiment of the present invention.

FIG. 2 is a schematic view illustrating the establishment of an MP (Multipath)-capable TCP flow in accordance with an embodiment of the present invention. In this embodiment, the general procedure for achieving a reduced TCP end-to-end transfer time is as follows (like numerals denote like components as in FIG. 1): The client 2 establishes a MP-capable TCP connection with the server 4 and sends the requests ('A'). The server 4 takes the decision of redirecting the sessions through a chain of TCP proxies 5 and informs the client 2 to establish a new subflow with the first proxy 5-1 of the chain depending on this decision. The server 4 may directly start with the data transfer. At the same time, the client 2 establishes the subflow with the first proxy 5-1 in the chain, which in turn is connected to the second proxy 5-2, which in turn is connected to the third proxy 5-3. The last proxy 5-3 in the chain is connected to the server 4 (again, it should be noted that the number of proxies 5 employed to be part of the chain of proxies 5 could it be different, i.e. both higher and lower than 3). Once the new subflow is connected to the proxy chain, the server 4 may close the initial subflow.

In more detail, the operations of MPTCP subflow redirection through a chain of proxies according to the embodiment illustrated in FIG. 2 unfold as follows:

1) Connection Establishment:

The client 2 performs the three-way MPTCP handshake, from which the server 4 extracts, e.g., an estimation of the RTT-CS. Then, the client 2 sends a HTTP REQUEST (denoted 'A' in FIG. 2), where HTTP is used on top of a multi-path TCP implementation (as described, e.g., in Internet Engineering Task Force (IETF), RFC6824: "TCP Extensions for Multipath Operation with Multiple Addresses", 2013). From this the server 4 is able to infer the SIZE of the data transfer (e.g., the HTTP REQUEST's URL points to a specific server's 4 resource).

B. Connection Redirection:

The server 4, based on the end-to-end performance variables, takes a decision to redirect the HTTP connection 'A' to a TCP proxy chain. Thus, the server 4 instructs the client 2 to add an MPTCP subflow through the proxy chain. For this purpose, the server 4 passes the IP address and port number of the first proxy 5-1 of the chain to the client 2. For this purpose, the MPTCP ADD_ADDR option may be used (denoted 'B' in FIG. 2). Depending on the implementation, the server 4 may start replying with the HTTP REPLY followed by data through the original subflow already.

C. Chain Establishment:

The client 2, upon reception of the subflow addition command 'B', establishes a new subflow with the proxy chain by performing a connection ('C') to the first proxy 5-1 of the chain. For this purpose, the MPTCP MP_JOIN option may be used Again, the establishment of the chain could happen in different ways: According to one embodiment the chain may be pre-established, i.e. for instance, the server (or the server's administrator) triggers the deployment of a number of proxies 5 proactively, and it configures each proxy 5 to establish a connection to the next proxy 5 in the chain, with the last proxy 5-3 configured to connect to the origin server 4. Alternatively, the chain may be dynamically-established, i.e. for instance, the server (or the server's administrator) triggers the deployment of a number of proxies 5 for the MPTCP subflow proactively, but it does not configure the proxies 5 in advance. Each proxy 5 autonomously decides if the next hop for connecting the subflow should be another proxy 5 (and which one) or the server 4. Likewise, the chain's proxies 5 may be proactively created or dynamically created, e.g., booting virtual machines on the fly when a request comes.

D. Data Transfer:

After the subflow 'C' through the proxy chain is established, the server 4 closes the original subflow (indicated at 'D'). The transfer of the HTTP REPLY followed by data is started or continued on the subflow 'C' through the chain.

Finally, to be noted that the embodiments described in connection with FIGS. 1 and 2 can both be used at the same time if the MPTCP implementation supports falling back to standard TCP operation. The server 4 is then able to fall back to HTTP request/redirect/reply approach in the first phase when MPTCP is not supported by the client 2.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As described, an embodiment of the present invention provides a method for establishing a TCP connection between a first end-point (1) and a second end-point (3) that reduces TCP end-to-end transfer time and thereby accelerating the data transfer. The method includes: establishing a first TCP connection between the first end-point (1) and the second end-point (3); the second end-point (3) dynamically deciding on redirecting the first TCP connection via a chain of proxies (5) that interconnects the first and the second end-points (1; 3); in case of a redirection decision by the second end-point (3), the first end-point (1) establishing a new TCP connection with the first proxy (5-1) of the chain of proxies (5); and establishing a segmented TCP connection between the first end-point (1) and the second end-point (3) via the chain of proxies (5) and transferring data between the first end-point (1) and the second end-point (3) through the chain of proxies (5).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for establishing a transmission control protocol (TCP) connection between a first end-point and a second end-point, the method comprising:
   establishing, by the second end-point, a first TCP connection between the first end-point and the second end-point;
   dynamically deciding, by the second end-point, on redirecting the first TCP connection via a chain of proxies that interconnects the first end-point and the second end-point;
   after deciding to perform a connection redirection, sending, by the second end-point and to the first end-point, a redirection command comprising an indication of a first proxy from the chain of proxies that interconnects the first end-point and the second end-point;
   establishing, based on sending the redirection command, a new segmented TCP connection between the first end-point and the second end-point via the chain of proxies; and
   transferring data between the first end-point and the second end-point through the chain of proxies.

2. The method according to claim 1,
   wherein the first end-point is a client,
   wherein the second end-point is a server, and
   wherein the client contacts the server requesting a download of a resource.

3. The method according to claim 1, wherein each proxy of the chain of proxies between the first end-point and the second end-point runs a transmission control protocol (TCP) flow control algorithm independently from the other proxies of the chain of proxies.

4. The method according to claim 1, wherein the second end-point, upon being contacted by the first end-point, determines and/or evaluates one or more end-to-end performance variables that are capable of affecting an end-to-end flow performance between the first end-point and the second end-point.

5. The method according to claim 4, wherein the end-to-end performance variables include: an end-to-end round trip time (RTT) of a path between the first end-point and the second end-point, a bandwidth of the path between the first end-point and the second end-point, a size of the data transferred by the network flow, and/or a delay.

6. The method according to claim 1, wherein the first TCP connection between the first end-point and the second end-point is established by the first end-point performing a three-way TCP handshake or a multipath TCP (MPTCP) handshake with the second end-point.

7. The method according to claim 1, wherein the second end-point decides on performing the connection redirection of an incoming network flow from the first end-point through the chain of proxies based on a determination and/or evaluation of one or more end-to-end performance variables.

8. The method according to claim 7, wherein the first end-point establishes the new segmented TCP connection with the first proxy in the chain of proxies upon reception of the redirection command from the second end-point.

9. The method according to claim 1, wherein the redirection command contains an instruction for the first end-point to download a requested resource from the first proxy of the chain of proxies or to add a multipath TCP (MPTCP) subflow through the chain of proxies.

10. The method according to claim 1, wherein the second end-point starts sending data to the first end-point via the first transmission control protocol (TCP) connection prior to the establishment of the new segmented TCP connection.

11. The method according to claim 1, wherein the chain of proxies is pre-established, with each proxy of the chain being configured to retrieve a given resource from the next proxy in the chain and with the last proxy of the chain being configured to retrieve the resource from the second end-point.

12. The method according to claim 11, further comprising:
   after deciding to perform the connection redirection, sending, by the second end-point and to each proxy of the chain of proxies, a deployment command comprising an indication of the next proxy in the chain, and wherein the deployment command for the last proxy of the chain comprises an indication of the second end-point.

13. The method according to claim 1, wherein the chain of proxies is dynamically established, with each proxy autonomously deciding on the next hop of the chain for retrieving a given resource.

14. The method according to claim 13, further comprising:
   after deciding to perform the connection redirection, sending, by the second end-point and to each proxy of the chain of proxies, a deployment command comprising an indication that the chain is to be dynamically established.

15. The method according to claim 1, wherein the proxies of the chain of proxies are created and/or activated proactively or dynamically.

16. A server, being configured to establish a transmission control protocol (TCP) connection with a client, the server comprising:
   a receiver being configured to receive a request for TCP connection establishment from a client;
   an analyzer being configured to determine and/or evaluate, based on the request for TCP connection establishment from the client, one or more end-to-end performance variables that are capable of affecting an end-to-end flow performance towards the client;
a decider for dynamically deciding on redirecting a first TCP connection via a chain of proxies that interconnects the server with the client; and
a transmitter being configured to:
send a redirection command comprising an indication of a first proxy from the chain of proxies that interconnects the server with the client after deciding to perform a connection redirection, and wherein a new segmented TCP connection is established between the client and the server via the chain of proxies based on the transmitter sending the redirection command; and
transfer data between the server and the client through the chain of proxies.

17. The method according to claim 1, wherein the redirection command indicates an intern& protocol (IP) address or port number of the first proxy.

18. A server, being configured to establish a transmission control protocol (TCP) connection with a client, the server comprising:
one or more processors; and
a non-transitory computer-readable medium having processor-executable instructions stored thereon, wherein the processor-executable instructions, when executed, facilitate:
establishing a first TCP connection between the first end-point and the server;
dynamically deciding on redirecting the first TCP connection via a chain of proxies that interconnects the first end-point and the server;
after deciding to perform a connection redirection, sending, to the first end-point, a redirection command comprising an indication of a first proxy from the chain of proxies that interconnects the first end-point and the server;
establishing, based on sending the redirection command, a new segmented TCP connection between the first end-point and the server via the chain of proxies; and
transferring data between the first end-point and the server through the chain of proxies.

\* \* \* \* \*